J. H. SHERARD.
ATTACHMENT FOR HARROWS.
APPLICATION FILED APR. 14, 1909.
978,665.
Patented Dec. 13, 1910.
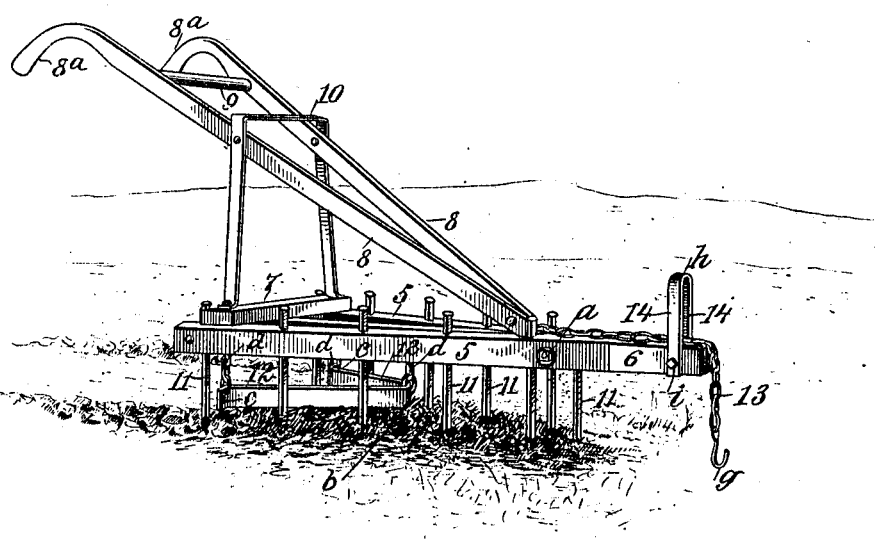
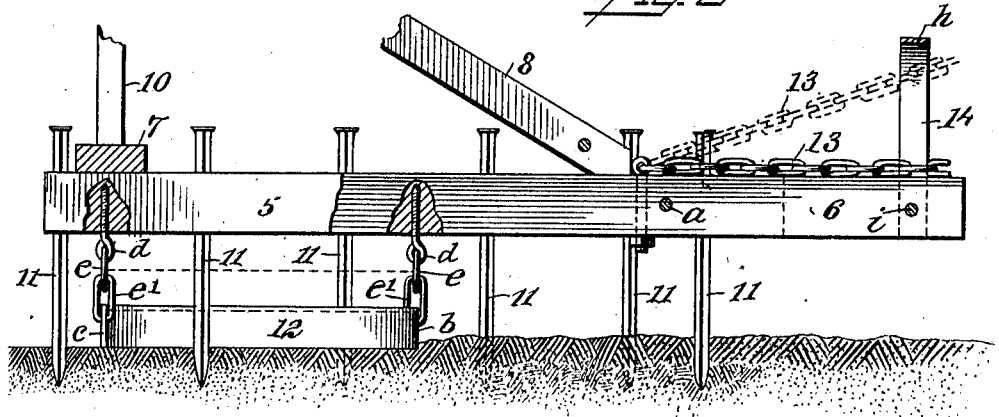
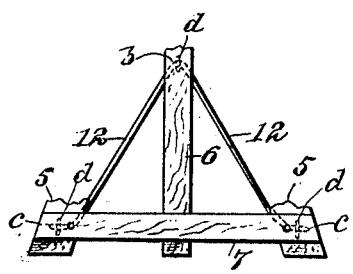
WITNESSES
E. J. Bromley,
Wm. P. Patton
INVENTOR
John H. Sherard.
BY
Munn & Co
ATTORNEYS

UNITED STATES PATENT OFFICE.

JOHN H. SHERARD, OF SHERARD, MISSISSIPPI.

ATTACHMENT FOR HARROWS.

978,665.

Specification of Letters Patent. Patented Dec. 13, 1910.

Application filed April 14, 1909. Serial No. 489,777.

*To all whom it may concern:*

Be it known that I, JOHN H. SHERARD, a citizen of the United States, and a resident of Sherard, in the county of Coahoma and State of Mississippi, have invented new and useful Improvements in Attachments for Harrows, of which the following is a full, clear, and exact description.

This invention relates to manually-controlled harrows used to level plowed soil that is divided into beds by longitudinal furrows, and has for its object to provide novel, simple means for pendently connecting a leveling device with the frame of a harrow of the type indicated, which will permit the leveling device to conform with the general surface of the soil over which it is drawn, independently of the action of the harrow teeth on the plowed soil.

A further object is to provide an attachment that is secured on the front portion of the harrow frame and receives the draft chain that connects a draft animal with the harrow, said attachment controlling the lateral turning movement of the harrow in either direction, and permitting the harrow to traverse the soil without being raised at its front end therefrom by the pull of the animal on said front end.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a perspective view of a harrow having the improvements thereon; Fig. 2 is an enlarged partly sectional side view of a harrow frame in part and teeth thereon, showing the improved means for suspending a leveler device from the frame, and also an improved controlling means for a draft chain; and Fig. 3 is a fragmentary plan view of the harrow frame and leveler device hung therefrom by the improved means.

The improved attachments, as before indicated, are applicable to a well-known construction of a harrow, and are shown as applied to a harrow adapted for manual control when drawn by an animal.

Briefly described, the harrow having the improvements thereon embodies the following details: The harrow frame is substantially triangular, comprising two side beams 5, 5, secured at their forward ends on the sides of a central beam 6, near the front end of the latter by a transverse bolt $a$. From their point of attachment to the beam 6, the side beams 5, 5, diverge therefrom an equal degree and near the rear ends of the three beams 5, 6, 5, said beams are spaced apart by a transverse beam 7, which is secured thereon by suitable means. Upon the central beam 6, the joined forward ends of two handle bars 8, 8, are secured and divergently extend rearward terminating in handles $8^a$, $8^a$, and near said handles are spaced apart by a stretcher rod 9. The connected handle bars 8 are supported in an upwardly and rearwardly inclined position, by a metal yoke 10 that is attached to said handle bars near the top cross bar of said yoke and at the lower ends thereof, secured upon the transverse frame beam 7. In the beams 5, 5, and 6, vertically-disposed teeth 11 are downwardly inserted at suitable distances apart, and as shown, a space on the central beam 6 for a distance forward of the transverse frame beam 7 is devoid of teeth, and also for a distance from the front end thereof.

The leveling device consists of a V-shaped blade having suitable dimensions, formed of a flat bar bent at its center so as to produce an angle $b$ from which two limbs 12 diverge, that at their ends are bent so as to form short flanges $c$ thereon. The leveler device is hung from the under sides of the central beam 6, and the side beams 5, by means of three eye bolts $d$, one of which is inserted upwardly into the central beam at a proper distance from the transverse beam 7, and the remaining eye bolts are in a like manner inserted upwardly into the side beams 5 at an equal distance from the center of the beam 7.

In the perforated head of the forward eye bolt $d$, a link $e$ is inserted, whereon another link $e'$ is coupled, and the latter-named link has a loose engagement within a perforation formed to receive it in the leveler blade at its front angle $b$. In each eye bolt $d$ that depends from the transverse beam 7, a link $e$ similar to the link $e$ on the forward eye bolt $d$ is loosely secured, and in said pendent links $e$ two other links, similar to the link $e'$ on the forward link $e$ are respectively secured loosely. The rear links $e$ are respectively coupled with a corresponding flange $c$ on the rear ends of the blade members 12 by their engagement with perforations in said flanges, and as the links e, e', are all of equal length, it will be seen that the leveler blades 12 will be hung so that their lower edges will be parallel with the frame members 5, 5.

A harrow of the construction described, is preferably drawn by means of a chain 13, that at one end is secured upon the central beam 6, near the point of connection of the side beams 5, 5, therewith, and thence extends forwardly for connection at the front end with a draft animal by means of a hook g on said end of the chain that connects with a swingletree, not shown.

A bracket arm, comprising two limbs 14, 14, that are joined together and spaced apart parallel with each other by a transverse member h, which connects their upper ends, is mounted upon the forward end portion of the central beam 6 that is embraced between the limbs 14, which are clamped thereon by means of a cross bolt i.

In service the chain 13 is passed between the upright limbs 14 of the bracket arm and extended forwardly for connection with a draft animal, as before explained. It will be seen that the bracket arm insures a direct pull upon the harrow, facilitating a quick lateral movement thereof toward either side, and as the chain is connected to the beam 6, near the front ends of the handle bars 8, it will cause the front portion of the harrow to be evenly embedded along with the rear portion thereof. Further, it will be noted that if the draft animal is of ordinary height, or is a small beast such as a mule, the pull of the chain will be in a plane near the central beam 6 of the harrow, but if a large draft animal is employed, the line of draft had by the chain will incline it upward and forward, as shown by dotted lines in Fig. 2.

The employment of the improved means for controlling the pull of the chain connection 13 is very advantageous, as it permits the teeth 11 of the harrow to be evenly embedded in the plowed soil, and thus be adapted for breaking up clods of the soil over which the harrow is drawn.

Ordinarily a manually-controlled harrow is connected by a clevis with a short chain and swingletree to a draft animal, consequently the travel of a large horse having considerable height, will, if thus connected to a harrow, cause the front end of the latter to rise and fall in accord with the movements of the animal, and by a partial or complete removal of the forward teeth of the harrow, fail to properly harrow the soil.

It will be seen that by the coöperation of the loosely-suspended leveler device and the upright slotted bracket arm, the leveler will be permitted to conform with the soil as the teeth of the harrow break up the clods of earth, and any clods that are unbroken will be pushed laterally by the V-shaped leveling device, so that after the harrow has been drawn over an entire bed of soil between the furrows that separate the beds, the clods of earth will be pushed from the beds into the furrows or gutters and the beds rendered smooth and level for planting.

Having thus described my invention, I claim as new and desire to secure by Letters Patent:

1. In a harrow of the character described, the combination with a harrow frame, of a leveler device formed of a metal bar bent into V-shape and having the ends of its limbs bent outwardly to form short flanges, three eye bolts engaging the frame at three points, and a loose link connection between each eye bolt and the leveler device, said connections respectively engaging the angular front corner and the flanges at the free rear ends of the V-shaped leveler device.

2. The combination with a triangular shaped harrow frame, of a leveler device formed of a flat bar of metal bent into V-shape and having the ends of its limbs bent outwardly to form flanges, and flexible connections between the harrow frame and leveler device, the connections engaging the angular front end and the flanges of the leveler device.

In testimony whereof I have signed my name to this specification in the presence of two subscribing witnesses.

JOHN H. SHERARD.

Witnesses:
ROBT. S. ANINGTON,
HARRY F. BOWEN.